United States Patent [19]

May et al.

[11] Patent Number: 4,997,246

[45] Date of Patent: Mar. 5, 1991

[54] SILICON-BASED RIB WAVEGUIDE OPTICAL MODULATOR

[75] Inventors: Paul G. May, Croton-on-Hudson; Subramanian S. Iyer, Yorktown Heights, both of N.Y.

[73] Assignee: International Business Machines Corporation, Armonk, N.Y.

[21] Appl. No.: 456,006

[22] Filed: Dec. 21, 1989

[51] Int. Cl.$^5$ .......................... G02B 6/10; G02B 6/12
[52] U.S. Cl. .................. 350/96.14; 350/96.13
[58] Field of Search ............... 350/96.11, 96.12, 96.13, 350/96.14

[56] References Cited

U.S. PATENT DOCUMENTS

| | | | |
|---|---|---|---|
| 4,070,094 | 1/1978 | Martin | 350/96.14 |
| 4,093,345 | 6/1978 | Logan et al. | 372/45 X |
| 4,360,246 | 11/1982 | Figueroa et al. | 350/96.12 |
| 4,438,447 | 3/1984 | Copeland, III et al. | 357/19 |
| 4,517,581 | 5/1985 | Thompson | 357/30 |
| 4,729,618 | 3/1988 | Yoshida et al. | 350/96.11 |
| 4,745,449 | 5/1988 | Chang et al. | 357/40 |
| 4,787,691 | 11/1988 | Lorenzo et al. | 350/96.12 X |
| 4,793,677 | 12/1988 | Adams et al. | 350/96.14 |

OTHER PUBLICATIONS

"Highly Efficient Waveguide Phase Modulator for Integrated Optoelectronics" Appl. Phys. Lett. vol. 48, No. 19, 12 May, 1986, A. Alping et al.
"Integrated All-Optical Modulator and Logic Gate for Fiber Optics Systems" IGWO 1988, pp. 351-354, R. Normandin et al.
"All-Silicon Active and Passive Guided-Wave Components for =1.3 and 1.6 m" Journal of Quantum Electronics, vol. QE-22, No. 6, Jun. 1986, R. Soref et al.
"Light-by-Light Modulation in Silicon-on-Insulator Waveguides", IGWO 1989, by R. Soref et al.
"Infra14 Red Light Modulator of Ridge-Type Optical Waveguide Structure Using Effect of Free-Carrier Absorption" Electronics Letters, 14 Aug. 1986, vol. 22, No. 17, S. Kaneda et al.
"Novel Single Quantum Well Optoelectronic Devices Based on Exciton Bleaching" Jrnl. of Lightwave Technology, vol. LT-5, No. 9, 9/87, J. Abeles et al.

*Primary Examiner*—John D. Lee
*Assistant Examiner*—Stephen W. Barns
*Attorney, Agent, or Firm*—Perman & Green

[57] ABSTRACT

An optical modulator [30] includes a waveguide region having, for radiation of a predetermined wavelength such as 1.3 microns, a variable optical transmittance characteristic. The optical transmittance characteristic is a function of a difference between an index of refraction of a first region [36] comprised of silicon having a first type of electrical conductivity and an index of refraction of a second adjacent region [34] comprised of an insulator such as a silicon dioxide. The modulator further includes a third region [38], also comprised of silicon, disposed adjacent to the first region. The third region has a second type of electrical conductivity for forming a p-n junction with the first region. Charge carriers are injected into the first region for varying the index of refraction thereof such that the optical transmittance characteristic of the waveguide region is varied.

18 Claims, 2 Drawing Sheets

SILICON-BASED RIB WAVEGUIDE OPTICAL MODULATOR

FIELD OF THE INVENTION

This invention is related generally to opto-electronic devices and, in particular, to a silicon-on-insulator (SOI) based rib waveguide optical modulator including at least one p-n junction.

BACKGROUND OF THE INVENTION

As silicon-based circuits achieve faster operating speeds chip-to-chip delays become a limiting factor in high speed computer applications. To overcome this problem optical interchip communication has been suggested as a means to limit the delay between chips. However, silicon is not an active optical material. Thus, optical sources disposed on a silicon integrated circuit require either a hybrid-material or a hybrid packaging technology to be fabricated. For example, for complete integration GaAs/Si and other hybrid structures must be fabricated. In such hybrid-structure technology high speed GaAs circuitry may be employed to modulate an optical signal being transferred through a silicon integrated circuit either by directly modulating the light source, or by taking advantage of the electro-optical activity of the material to modulate the light itself. An alternative hybrid packaging approach where, for example, the GaAs light source is grown on a GaAs substrate and driven by silicon circuitry from another chip has limitations in terms of modulation speed and flexibility. One limitation arises in those situations wherein the light source is split into many channels that need to be independently modulated.

In general, such hybrid materials exhibit fundamental material and processing problems. As a result, it is a desirable goal to provide on-chip modulation of a dc driven optical radiation source with a silicon-based integrated circuit without requiring the provision of a hybrid-material optical modulator. It is also a desirable goal to provide an optical modulator that is responsive to electrical signals, that is an opto-electronic modulator, such that light is modulated in accordance with electrical signals generated on the chip.

In U.S. Pat. No. 4,745,449, issued May 17, 1988 Chang et al. disclose a Group III-V FET-type photodetector. In U.S. Pat. No. 4,517,581, issued May 14, 1985, Thompson discloses a photodetector in the form of a JFET in which the gate is defined as a rib that also functions as an optically absorbing optical waveguide. In U.S. Pat. No. 4,360,246, issued Nov. 23, 1982 Figueroa et al. disclose an integrated waveguide and FET detector. The devices of both Thompson and Figueroa et al. are constructed of Group III-V material.

In U.S. Pat. No. 4,729,618, issued Mar. 8, 1988 Yoshida et al. disclose a hybrid integrated optical circuit that provides a high cost and high performance substrate material such as InP or GaAs for a portion of the circuit while other portions having a relatively low degree of integration, such as a bent waveguide, are formed of a low cost substrate material.

In U.S. Pat. No. 4,438,447 issued Mar. 20, 1984 Copeland, III et al. disclose an electro-optic integrated circuit having on-chip electrical connections that are replaced by an optical waveguide layer. The semiconductor chip of Copeland is comprised of Group III-V material.

In JP55-138889 Mita discloses a semiconductor pulse generator said to have an integrally formed light oscillator and a FET through a light waveguide on a monocrystalline substrate.

In a journal article entitled "Guided wave GaAs/Al-GaAs FET optical modulator based on free carrier induced bleaching", Electron. Lett. (UK), Vol. 23, No. 24, 19 Nov. 1987, pp. 1302-1304 Abeles et al. disclose a Group III-V optical modulator based on a free carrier bleaching effect. The device is said to be a single quantum well FET optical modulator having a FET gate self aligned to a waveguide. A similar device is also disclosed by Abeles et al. in a journal article "Novel Single Quantum Well Optoelectronic Devices Based on Exiton Bleaching", Journal of Lightwave Technology, Vol. LT-5, No. 9, September, 1987.

A. Alping et al. disclose reverse-biased ridge waveguided AlGaAs double heterostructures in a journal article entitled "Highly efficient waveguide phase modulator for integrated optoelectronics", Appl. Phys. Lett., Vol. 48, No. 19, 12 May 1986.

However, this prior art does not disclose an optical modulator for silicon-based integrated circuits.

In an article entitled "Integrated All-Optical Modulator and Logic Gate for Fiber Optics Systems", IGWO 1988, pps. 351-354, R. Normandin et al. disclose a silicon-based modulator for radiation within the range of 1.32 to 1.55 microns. Modulating light is absorbed in the waveguide and creates electron-hole pairs via indirect interband absorption, thereby effectively lowering the waveguide's index of refraction at the wavelength of the guided light. The modulator of Normandin is thus controlled by an optical signal and not by an electrical signal.

In an article entitled "Infra-red Light Modulator of Ridge-Type Optical Waveguide Structure Using Effect of Free-Carrier Absorption", Electronics Letters, 14/8/86, Vol. 22, No. 17, pp. 922-923, S. Kaneda et al. disclose the optical modulation of 10.6 micron radiation with a ridge waveguide structure including a p+ Si substrate (carrier concentration $5 \times 10^{18}/cm^{-3}$) and a p− Si waveguide (carrier concentration $1 \times 10^{14}/cm^{-3}$) overlying the substrate (FIG. 4). A tunnel MIS diode functions as an electrode for carrier injection.

In an article entitled "All-Silicon Active and Passive Guided-Wave Components for $\lambda = 1.3$ and 1.6 $\mu m$", Journal of Quantum Electronics, Vol. QE-22, No. 6, June 1986, R. A. Soref et al. disclose end coupled planar and channel waveguides at 1.3 microns fabricated in single-crystal Si layers grown epitaxially on heavily doped Si substrates.

FIG. 1a shows in cross-section a ridge waveguide device 10 similar to that disclosed by Soref et al. The device 10 includes an n+ <111> Si substrate 12 that is doped at a concentration of $3 \times 10^{19}$ cm$^{-3}$. Overlying the substrate 12 is an n-type epitaxial layer Si layer 14 having a ridge structure 16. The layer 14 is doped at a concentration of $9 \times 10^{14}$ cm$^{-3}$. Guided Light (GL) occupies a channel-waveguide region of the device 10. Due to the relatively small difference between the index of refraction of the layers 14 and 12 the layers are required to have a considerable thickness. By example, the dimensions of the device of FIG. 1a are A=10 microns, B=2.8 microns and C=4.2 microns. As a result this type of device has dimensions that are less than optimum for providing structure compatible with silicon based VLSI integration rules.

In a journal article entitled "Light-by-Light Modulation in Silicon-on-Insulator Waveguides", IGWO 1989, pps. 86–87 R. A. Soref et al disclose the optical modulation of 1.3 micron light with 800 nm light directed onto a ridge waveguide structure. FIG. 1b illustrates in cross-section a similar modulator 20. An n-type Si substrate 22 has a 0.4 micron thick (D) buried oxide layer 24 formed over a surface thereof. Overlying the oxide layer 24 is a 0.15 micron thick crystalline silicon layer over which a 3.0 micron thick epitaxially-grown Si layer is formed (C+B). Into the Si epilayer were etched strip waveguides having widths (A) of 5, 10, 20 or 40 microns. This device was said to be the first Si-on-SiO2 ridge guide reported in the literature. However, this device operates by optical and not optic electronic control.

It is thus one object of the invention to provide an opto-electronic modulator for a silicon-based integrated device, the opto-electronic modulator including a silicon waveguide region and an adjacent electrical insulator region.

It is another object of the invention to provide a SOI opto-electronic modulator having dimensions amenable to fabrication with VLSI circuits.

It is another object of the invention to provide an opto-electronic modulator/waveguide configuration wherein the modulation is performed by a change in an index of refraction caused by free carrier injection.

It is another object of the invention to provide a silicon-based integrated circuit having an on-chip opto-electronic modulator that does not require hybrid-material processing technologies.

SUMMARY OF THE INVENTION

The foregoing problems are overcome and other advantages are realized by an optical modulator including a waveguide region having, for radiation of a predetermined wavelength such as 1.3 microns, a variable optical transmittance characteristic. The optical transmittance characteristic is a function of a difference between an index of refraction of a first region comprised of silicon having a first type of electrical conductivity and an index of refraction of a second adjacent region comprised of an insulator such as a silicon dioxide. The modulator further includes a third region, also comprised of silicon, disposed adjacent to the first region. The third region has a second type of electrical conductivity for forming a p-n junction with the first region. Charge carriers are injected into the first region for varying the index of refraction thereof such that the optical transmittance characteristic of the waveguide region is varied. In one embodiment the p-n junction is located within an upstanding rib structure. In another embodiment the rib structure includes a vertical stack comprised of many p-n junctions. In a third embodiment two p-n junctions form a lateral bipolar transistor device used to enhance the speed of operation by both injecting charge carriers into the waveguide region and sweeping charge carriers out of the waveguide region. The modulator of the invention is shown to be well suited for fabrication with silicon-based integrated circuits for modulating radiation generated by an external source such as a laser diode. The various embodiments of the invention operate in a guiding mode or as switches in an extinction mode of operation. The modulators may form, by example, one arm of a Mach-Zender type intensity modulator for inducing, when operated in a non-extinction mode, a phase change in guided radiation passing therethrough, and thereby an intensity modulation in the output of the device.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1A:
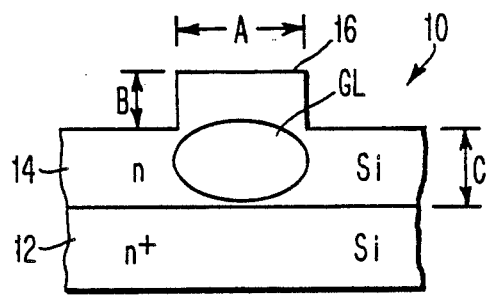
FIGS. 1a and 1b are cross-sectional views, not to scale, of prior art waveguide optical modulators.
Figure 1B:
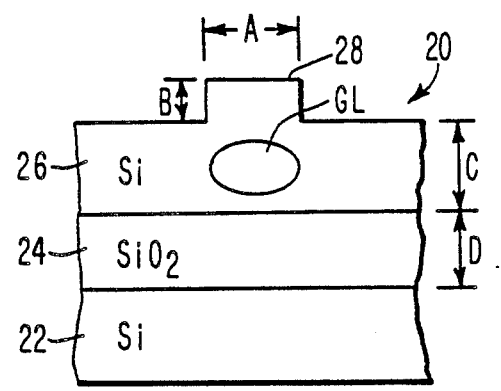
Figure 2:
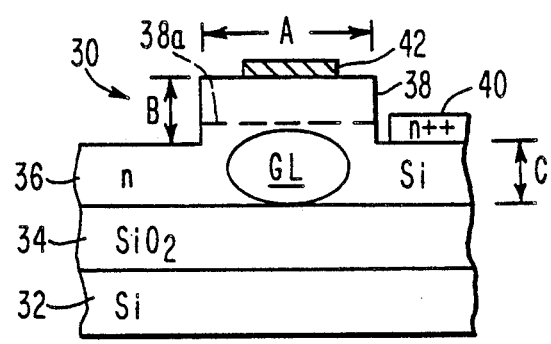
FIG. 2 is a cross-sectional view, not to scale, of an opto-electronic SOI extinction-type modulator constructed in accordance with a first embodiment of the invention and having a single p-n junction.
Figure 4:
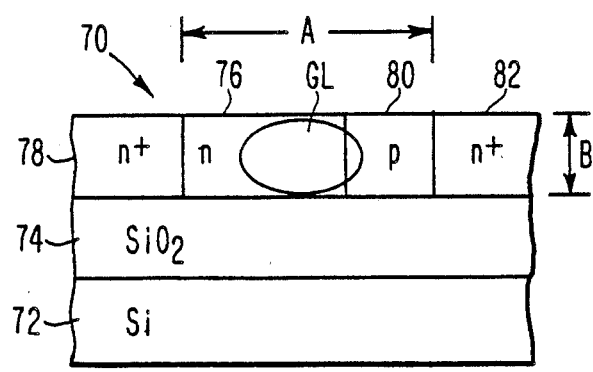
FIG. 4 is a cross-sectional view, not to scale, of a three terminal opto-electronic SOI modulator constructed in accordance with a third embodiment of the invention and including a lateral bipolar transistor for both injecting and sweeping out charge to increase the operating speed of the modulator.
Figure 3:
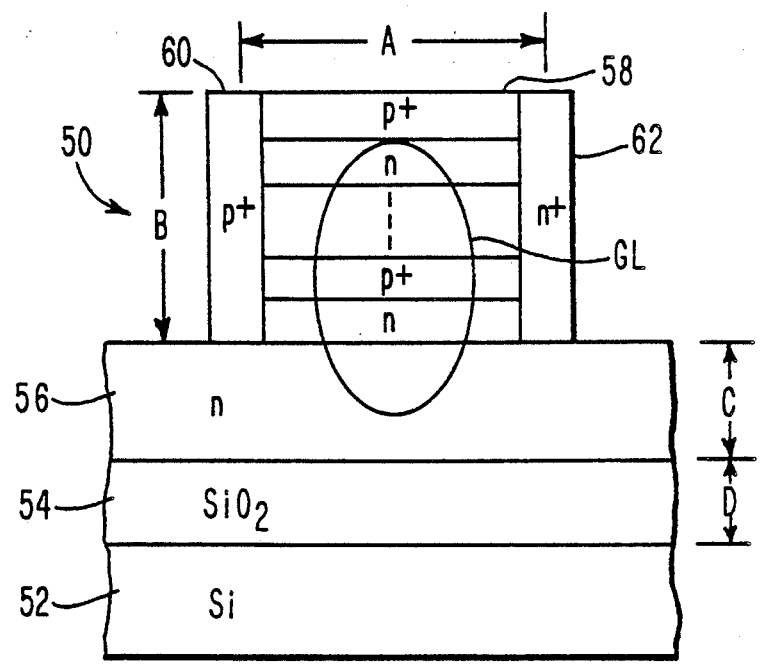
FIG. 3 is a cross-sectional view, not to scale, of an opto-electronic SOI extinction-type modulator constructed in accordance with a second embodiment of the invention and having a stack of p-n junctions.

Not shown in FIGS. 2-4 is an off-chip source of radiation, such as a GaInAsP laser operating at 1.3 microns, for supplying a dc light signal. The dc light signal is edge coupled by known means into the silicon rib-waveguide devices of the invention, the dc light signal being guided through the waveguide within the region designated GL (Guided Light).

FIG. 2 illustrates in cross-section, not to scale, an opto-electronic SOI extinction-type modulator device 30 constructed in accordance with a first embodiment of the invention. The modulator device 30 has a single p-n junction for injecting charge whereby the index of refraction of the waveguide channel region is altered.

Device 30 includes a Si substrate 32, a buried layer 34 of electrical insulator such as $SiO_2$, and an overlying Si epilayer 36. Epilayer 36 is etched to form a ridge waveguide 38 and is selectively doped such that the lower portion of the layer 36 is n-type and the upper portion is p+.

In accordance with the invention, the epi-Si layer 36 functions as a waveguide because of the large index of refraction difference (n=3.5 and n=1.5, respectively) between the epilayer 36 and the insulator layer 34. As a result of the large difference in the indices of refraction sub-micron thicknesses of silicon can be employed, thus ensuring Very Large Scale Integration (VLSI) size compatibility. Typical dimensions for single mode propagation at 1.3 microns are a Si guiding layer thickness (C) of 4000 Angstroms, a silicon dioxide thickness (D) also of 4000 Angstroms, a mesa (rib) height (B) of 400 Angstroms and a rib width (A) of 4000 Angstroms. The thickness of the Si substrate 32 may be any suitable value. It should be realized that the dimensions given herein in relation to the various embodiments of the invention are approximate only and that variations of these values are within the scope of the teaching of the invention.

In accordance with the invention a p-n metallurgical junction 38a, indicated by the dashed line, is formed below the ridge 38 for injecting charge into this region when the p-n junction 38a is suitably biased. In this regard an n++ region 40 is employed for electrically contacting the n-type portion of layer 36 and contact metal 42 is applied to the ridge 38 for electrically contacting the p+ portion of the layer 36.

Figure 5:
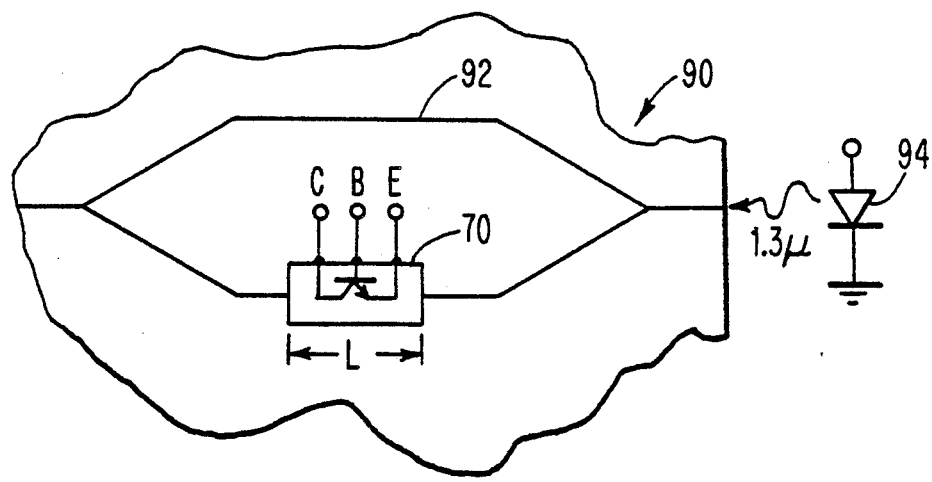
FIG. 5 is an elevational view, not to scale, of a portion of a silicon-based integrated circuit chip including a Mach-Zender intensity modulator having the device of FIG. 4 disposed in one arm for modulating 1.3 micron radiation sourced by an off-chip laser diode.

The device 30 of FIG. 2 operates in two distinct modes. A first mode encompasses the situation where light guiding occurs but, due to the index of refraction change induced by charge injection, the guided light experiences a phase change. This feature is exploited by fabricating the device into one arm of an integrated Mach-Zender phase modulator, as illustrated in FIG. 5 for the device of FIG. 4. For a device 30 of suitable length, that is a length suitable for providing a pi phase change, $\lambda/2 \delta n$, 100% modulation occurs at the output. By example, for an injection of $10^{19} cm^{-3}$ carriers an effective index of refraction change in the guide of 0.1% occurs (for the dimension shown in the figure) and therefore a device 500 wavelengths long, or 650 microns, provides 100% modulation of the 1.3 micron guided light.

A second mode of operation encompasses the situation where an injected carrier density of approximately $10^{19}$ cm$^{-3}$ results in extinction of the guided light, i.e. the rib 38 no longer functions as a waveguide. The device now functions as an extinction mode modulator.

The device 30 of FIG. 2, functioning in the extinction mode, represents a presently preferred embodiment due to the small dimensions of the device and the simplicity of structure and operation. A device length of approximately 50 microns is sufficient to provide 100% modulation at the output with a carrier density of approximately $10^{19}$ cm$^{-3}$.

In both modes of operation of the device 30, that is guiding and extinction, a major consideration is the switching speed of the device. The recombination time of silicon is typically of the order of microseconds and modulating speeds are of the order of a nanosecond for GHz operation. Carrier lifetime can be reduced by introducing recombination centers. However, this technique also reduces efficiency (i.e. effective carrier density for a given injection current). The small geometry of the SOI waveguide made possible by the teaching of the invention aids in reducing carrier lifetime. Recombination at interfaces is typically rapid and thus the speed of the device is primarily determined by the diffusion time to an interface. For the geometry presented this time is typically less than one nanosecond.

Another approach for providing rapid recombination operates the p-n junction 38a in a depletion mode so that recombination no longer plays a role in device operation. With the single junction 38a, however, there is a limit to the depletion area for a given carrier density. By example, for a doping density of $10^{18}$ cm$^{-3}$ the depletion width is 200 Angstroms.

One solution to this problem employs growth techniques such as Molecular Beam Epitaxy (MBE) to fabricate a p-n stack as shown in FIG. 3. FIG. 3 presents a cross-sectional view, not to scale, of an opto-electronic SOI extinction-type modulator device 50 constructed in accordance with a second embodiment of the invention, the modulator device 50 having a plurality of p-n junctions stacked one upon another. The device 50 includes a Si substrate 52, a buried layer 54 of SiO$_2$ and an overlying n-type Si epilayer 56. Disposed upon the epilayer 56 is a stack 58 comprised of a plurality of alternating thin p+-type and n-type layers. The alternating layers form a plurality of vertically disposed p-n junctions. A vertically disposed p+ region 60 is provided for electrically contacting the p+ layers and a vertically disposed n+ region 62 is provided for electrically contacting the n layers of the stack 58. The waveguide channel wherein the guided light is conveyed is disposed approximately as shown and includes portions of the alternating p+ and n layers of the stack 58. Dimension A is typically 4000 Angstroms, dimension B is within a range of 2000 to 8000 approximately Angstroms and dimensions C and D each approximately 2000 Angstroms. Each layer has a thickness of approximately 100 Angstroms.

Although the capacitance of the stack 58 increases as a function of the number of junctions the resistance decreases by the same amount. As a result the RC time constant remains substantially unchanged and the response of the device to a change in electrical signal is unaffected. To achieve the same modulation effect as the phase modulator device 30 of FIG. 2 a doping or carrier density of $10^{18}$ cm$^{-3}$ is required. The required number of junctions of the stack 58 is approximately 20.

Yet another approach for achieving high speed operation is to provide a three terminal device around the rib so that charge can be injected and subsequently swept out. In this regard FIG. 4 illustrates a cross-sectional view, not to scale, of a three terminal opto-electronic SOI modulator device 70 constructed in accordance with a third embodiment of the invention. The device 70 includes a lateral n-p-n bipolar transistor for both injecting and sweeping out charge to increase the operating speed of the modulator. Device 70 includes a Si substrate 72, a buried layer of SiO$_2$ 74 and an overlying Si epilayer. The epilayer is differentiated into an n-type region 76 for forming the collector of the transistor, an n+ region 78 for providing electrical contact to the collector, a p-type region 80 for forming the base of the transistor and an n+ region 82 for forming the emitter of the transistor. Light is guided through the lightly doped n-type and p-type regions 76 and 80. When the transistor is biased to an on state a carrier density of approximately $10^{18}$ cm$^{-3}$ is present in the waveguide region. This current density is typically not sufficient to operate the device 70 as an extinction modulator.

However, as shown in FIG. 5 an integrated circuit chip 90 is readily constructed to have a Mach-Zender intensity modulator 92 with the modulator device 70 located within one arm. The device 70 length (L) is typically several hundred microns. The modulation speed is independent of carrier lifetime and is determined instead by the switching on/off time of the bipolar transistor. Electrical contact is made to the collector (C), base (B) and emitter (E) terminals for biasing and operating the transistor to modulate 1.3 micron light from a source 94.

It should be realized that in general p-type and n-type materials can be exchanged without affecting the operation of the various embodiments of the invention. Furthermore, an insulating material such as silicon nitride (Si$_3$N$_4$) may be employed in place of SiO$_2$. Thus, while the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. An optical modulator comprising a waveguide region, the waveguide region having, for radiation of a predetermined wavelength, an optical transmission characteristic that is a function of an index of refraction of a first region comprised of silicon and an index of refraction of a second adjacent region comprised of an insulator, the waveguide region being confined substantially within the first region, wherein the first region is differentiated into a plurality of adjacent regions comprised of differing electrical conductivity type material for defining a three terminal electrical device, the three terminal electrical device operating to inject charge carriers into the first region for varying the index of refraction thereof such that the optical transmission characteristic of the waveguide region is varied.

2. An optical modulator as set forth in claim 1 wherein the second region is comprised of $SiO_2$.

3. An optical modulator as set forth in claim 1 wherein the predetermined wavelength is approximately 1.3 microns.

4. An optical modulator as set forth in claim 1 wherein the first and the second p-n junctions are located within an upstanding rib structure.

5. An optical modulator as set forth in claim 1 wherein the three terminal electrical device is comprised of a lateral bipolar transistor.

6. An optical modulator as set forth in claim 1 wherein an injected carrier density of approximately $10^{18} cm^{-3}$ within the first region results in an effective index of refraction change in the waveguide region of approximately 0.1%.

7. An optical modulator as set forth in claim 1 wherein the optical modulator is fabricated as a portion of an integrated circuit device having a substrate comprised of silicon, the optical modulator modulating, in accordance with an electrical signal coupled to three terminal electrical device, optical radiation passing through a portion of the integrated circuit device.

8. An optical modulator as set forth in claim 7 wherein the optical modulator is disposed within one arm of a Mach-Zender type intensity modulator.

9. An optical modulator as set forth in claim 1 wherein the modulator is fabricated as a portion of an integrated circuit device for modulating, in accordance with an electrical signal coupled to a base of the transistor device, optical radiation passing through a portion of the integrated circuit device.

10. An optical modulator as set forth in claim 9 wherein the transistor device is an n-p-n or a p-n-p device.

11. An optical modulator comprising a waveguide region, the waveguide region having, for radiation of a predetermined wavelength, an optical transmission characteristic that is a function of an index of refraction of a first region, comprised of silicon having a first type of electrical conductivity, and an index of refraction of a second adjacent region comprised of an insulator, the waveguide region being confined at least partially within the first region, the modulator further comprising a third region also comprised of silicon disposed adjacent to the first region such that the first region is interposed between the second and the third regions, the third region including a plurality of p-n junctions vertically disposed one above another for injecting charge carriers into the first region for varying the index of refraction thereof such that the optical transmission characteristic of the waveguide region is varied.

12. An optical modulator as set forth in claim 11 wherein the predetermined wavelength is approximately 1.3 microns.

13. An optical modulator as set forth in claim 11 wherein the third region includes an upstanding rib structure disposed upon the first region.

14. An optical modulator as set forth in claim 11 wherein the modulator is fabricated as a portion of an integrated circuit device for modulating, in accordance with an electrical signal coupled to the plurality of p-n junctions, optical radiation passing through a portion of the integrated circuit device.

15. An optical modulator as set forth in claim 11 wherein a carrier density of approximately $10^{18} cm^{-3}$ within the first region results in an effective index of refraction change in the waveguide region of approximately 0.1%.

16. An optical modulator as set forth in claim 11 and further comprising a first electrically conductive region coupled in common to the p-type material in each of the plurality of p-n junctions and a second electrically conductive region coupled in common to the n-type material in each of the plurality of p-n junctions.

17. A interferometer having at least two optical transmission paths, a first one of the optical transmission paths comprising:

a waveguide region having, for radiation of a predetermined wavelength, an optical transmission characteristic that is a function of an index of refraction of a first region comprised of silicon and an index of refraction of an underlying region comprised of an insulator, the waveguide region being confined substantially within the first region, the first region being differentiated into a plurality of adjacent regions comprised of differing electrical conductivity type material for defining a three terminal electrical device, the three terminal electrical device operating to inject charge carriers into the first region for varying the index of refraction thereof such that the optical transmission characteristic of the waveguide region is varied.

18. An interferometer as set forth in claim 17 wherein the three terminal electrical device is comprised of a pnp or an npn lateral bipolar transistor.

* * * * *